United States Patent
Xu et al.

(10) Patent No.: US 8,624,706 B2
(45) Date of Patent: Jan. 7, 2014

(54) CONTROL CIRCUIT FOR INDICATOR LIGHT

(75) Inventors: Feng Xu, Shenzhen (CN); Yong-Qian Deng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 235 days.

(21) Appl. No.: 13/198,716

(22) Filed: Aug. 5, 2011

(65) Prior Publication Data

US 2012/0249299 A1 Oct. 4, 2012

(30) Foreign Application Priority Data

Mar. 29, 2011 (CN) .......................... 2011 1 0076126

(51) Int. Cl.
*G08B 25/00* (2006.01)

(52) U.S. Cl.
USPC ............ 340/6.1; 340/635; 340/432; 323/268; 315/293; 330/10; 362/466

(58) Field of Classification Search
USPC ............ 340/635, 432, 6.1; 323/268; 315/293; 330/10; 362/466
See application file for complete search history.

(56) References Cited

U.S. PATENT DOCUMENTS

| 5,350,997 | A  | * | 9/1994  | Ghotbi et al. ................. 323/268 |
| 5,828,138 | A  | * | 10/1998 | McIver et al. ................ 307/10.1 |
| 2006/0083011 | A1 | * | 4/2006  | Buhr et al. .................... 362/466 |
| 2007/0046520 | A1 | * | 3/2007  | Liu et al. ....................... 341/155 |
| 2008/0111500 | A1 | * | 5/2008  | Hoover ....................... 315/293 |
| 2008/0143541 | A1 | * | 6/2008  | Zhang ........................... 340/635 |
| 2008/0284508 | A1 | * | 11/2008 | Walker et al. ................... 330/10 |
| 2011/0187517 | A1 | * | 8/2011  | Roths ............................ 340/432 |

* cited by examiner

*Primary Examiner* — Benjamin C Lee
*Assistant Examiner* — Chico A Foxx
(74) *Attorney, Agent, or Firm* — Altis Law Group, Inc.

(57) ABSTRACT

A control circuit for an indicator light includes a power source, a switch unit, a ground resistor, and a first adjusting unit. The power source supplies a voltage. The switch unit is connected between the power source and the indicator light and turns on or turns off the indicator light. The ground resistor is connected between the power source and the ground via the indicator light and the switch unit. The first adjusting unit includes a first adjusting resistor and a first control switch. The adjusting resistor is connected between the indicator light and the ground via the first control switch. The first control switch is capable of connecting the first adjusting resistor with the ground resistor in parallel.

7 Claims, 1 Drawing Sheet

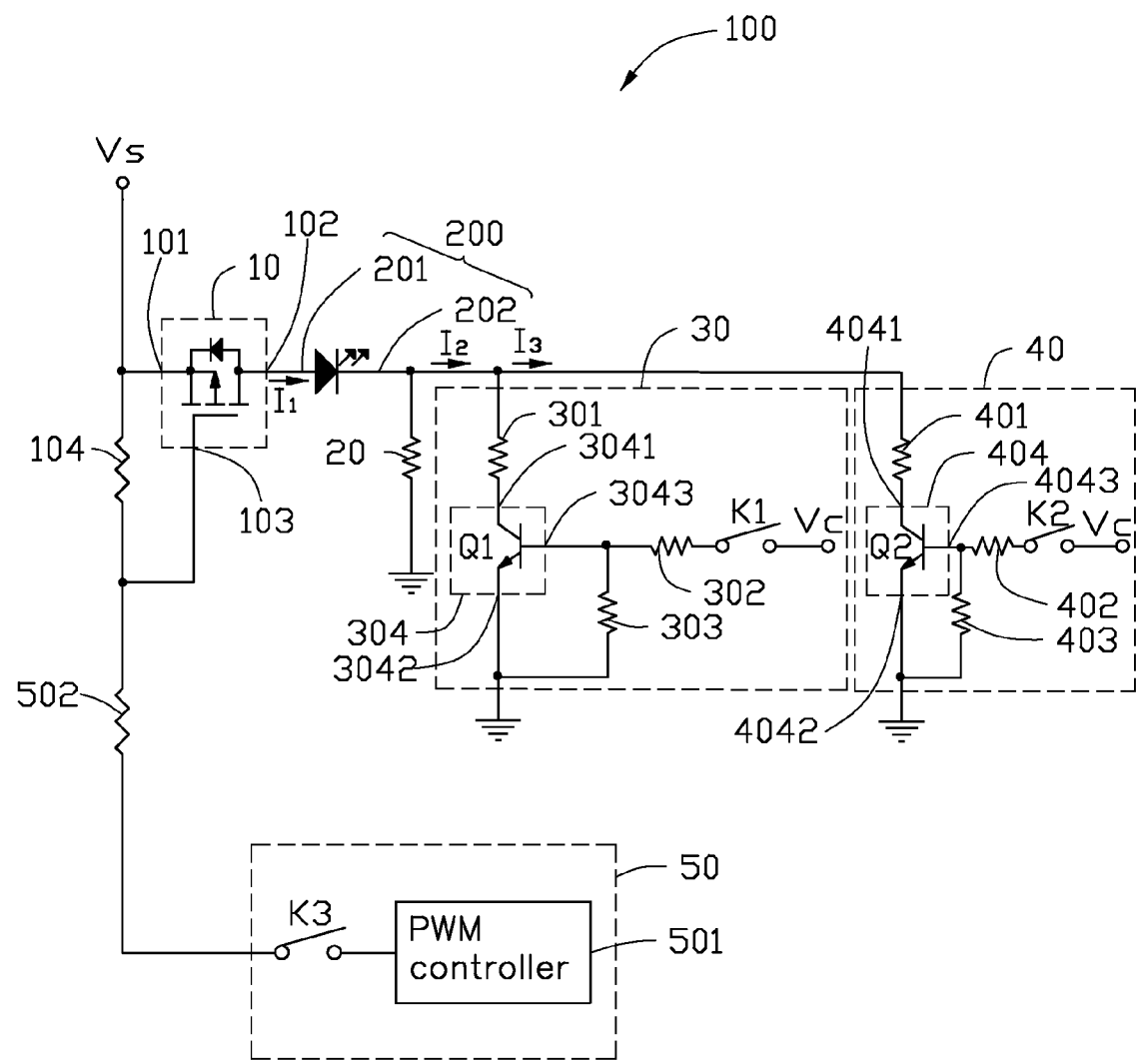

CONTROL CIRCUIT FOR INDICATOR LIGHT

BACKGROUND

1. Technical Field

The present disclosure relates to control circuits, and particularly, to a control circuit for an indicator light.

2. Description of Related Art

Electronic products, such as computers, usually include indicator lights that indicate the working status of the electronic products or the components of the electronic products, such as a working state of a network or a power supply of the electronic products. However, typical indicator lights will remain at a preset brightness or a preset state when the electronic products or the components of the electronic products remain in a certain state. For example, when the electrical product is powered on and works properly, the indicator lights will remain at the preset brightness or they will flash. However, sometimes, the users may wish to turn off or turn down the indicator light if the electronic product works properly. However, at this time, this cannot be achieved.

Therefore, it is desirable to overcome the limitations described above.

BRIEF DESCRIPTION OF THE DRAWING

The FIGURE is a circuit diagram of a control circuit for an indicator light, according to an exemplary embodiment.

DETAILED DESCRIPTION

Exemplary embodiments of the disclosure will be described in detail, with reference to the accompanying drawing.

Referring to the drawing, a control circuit 100 for controlling brightness of an indicator light 200, according to an exemplary embodiment is shown. The control circuit 100 includes a switch unit 10, a first adjusting unit 30, a second adjusting unit 40, and a status control unit 50.

The indicator light 200 includes a first electrode 201 and a second electrode 202. The indicator light 200 is turned on when a voltage is applied to the first electrode 201 and the second electrode 202. The first electrode 201 is connected to a power source Vs via the switch unit 10. The second electrode 202 is grounded via a ground resistor 20. In one embodiment, the indicator light 200 is a light emit diode (LED). The first electrode 201 is the positive terminal of the LED. The second electrode 202 is the negative terminal of the LED. In one exemplary embodiment, resistance of the resistor 20 is about 168 ohms, and the power source Vs supplies an about 3.3V direct current (DC) voltage s to the indicator light 200.

The switch unit 10 includes a first terminal 101, a second terminal 102, and a control terminal 103. The first terminal 101 electrically connects to the second terminal 102 when the control terminal 103 receives a low voltage level (for example, a low voltage level of logic 0) or disconnects from the second terminal 102 when the control terminal 103 receives a high voltage level (for example, a high voltage level of logic 1). In one embodiment, the switch unit 10 is a p-channel MOSFET and includes a source connection, a drain connection, and a gate connection which respectively serves as the first terminal 101, the second terminal 102 and the control terminal 103. The first terminal 101 is connected to the power source Vs. The second terminal 102 is connected to the first electrode 201. The control terminal 103 is connected to the power source Vs via a first resistor 104. In one embodiment, the resistance of the first resistor 104 is about 470 kilo ohms.

The first adjusting unit 30 includes a first adjusting resistor 301, a second resistor 302, a third resistor 303, a first operation switch K1, a first control switch 304 and a control power source Vc. The first control switch 304 includes a first connection 3041, a second connection 3042, and a third connection 3043. The third connection 3043 connects or disconnects the first connection 3041 and the second connection 3042. In one embodiment, the first control switch 304 is an npn type BJT Q1. The collector, the emitter and the base of the BJT Q1 respectively serves as the first connection 3041, the second connection 3042 and the third connection 3043. The first connection 3041 is connected to the second electrode 202 via the first adjusting resistor 301. The second connection 3042 is grounded. One end of the second resistor 302 is connected to the third connection 3043, the other end is connected to the operation switch K1. The first operation switch K1 is connected between the control power source Vc and the second resistor 302. The third resistor 303 is connected between the third connection 3043 and the ground.

The second adjusting unit 40 is similar to and connected in parallel to the first adjusting unit 30. The second brightness adjusting unit 40 includes a second adjusting resistor 401, a fourth resistor 402, a fifth resistor 403, a second operation switch K2, a second control switch 404 and the control power source Vc. The second control switch 404 includes a fourth connection 4041, a fifth connection 4042 and a sixth connection 4043. In one embodiment, the second control switch 404 is also an npn type BJT Q2. The collector, the emitter and the base of the BJT Q2 respectively serves as the fourth connection 4041, the fifth connection 4042 and the sixth connection 4043. The fourth connection 4041 is connected to the second electrode 202 via the second adjusting resistor 401. The fifth connection 4042 is grounded. One end of the fourth resistor 402 is connected to the sixth connection 4043, the other end is connected to the second operation switch K2. The second operation switch K2 is connected between the control power source Vc and the fourth resistor 402. The fifth resistor 403 is connected between the sixth connection 4043 and the ground. In one embodiment, the resistances of the first adjusting resistor 301 and the second adjusting resistor 401 are both about 168 ohms. The resistances of the second resistor 302, the third resistor 303, the fourth resistor 402, and the fifth resistor 403 are all about 4.7 kilo ohms.

The state control unit 50 includes a pulse width modulation (PWM) controller 501, a state converting switch K3. The PWM controller 501 outputs a square-wave pulse voltage having an adjustable duty ratio. In one embodiment, the PWM controller 501 outputs square-wave pulse voltage having an amplitude of about 3.3 volts. An output terminal of the PWM controller 501 is connected to the control terminal 103 via the state switch K1 and a sixth resistor 502. In one embodiment, the value of the sixth resistor 502 is about 10 thousands ohms. In alternative embodiments, the sixth resistor 502 can be omitted.

In use, when the state converting switch K3 is turned off, the control terminal 103 receives a low voltage level (a low voltage level of logic 0), the first terminal 101 receives a high voltage level (a high voltage level of logic 1). The switch unit 10 is turned on. The control circuit 100 may control the indicator light 200 in one of the following three states according to user operations. In detail, when the first operation switch K1 and the second operation switch K2 are both turned off, the indicator light 200 is serially connected with the ground resistor 20. A first electric current $I_1$ passing through the indicator light 200 is proportional to the voltage of the power source Vs and inversely proportional to the resistance of the ground resistor 20, as the resistance of the indicator light 200 is very small and can be ignored for simplicity. In this situation, the indicator light 200 has a first brightness. If only one of the first operation switch K1 or the second operation switch K2 is turned on, for example, the first operation switch K1 is turned on, the base of the BJT Q1 receives a high voltage level (a low voltage level of logic 1) and thus the BJT Q1 is turned on while the BJT Q2 is turned off. The first adjusting resistor 301 is connected with the ground resistor 20 in parallel. A second electric current $I_2$ passing through the indicator light 200 is proportional to the voltage of the power source Vs and inversely proportional to the effective resistance of the ground resistor 20 and the first adjusting resistor 301. In this situation, the indicator light 200 is adjusted to a second brightness which is brighter than the first brightness as the second current $I_2$ is greater than the first current $I_1$. When the first operation switch K1 and the second operation switch K2 are both turned on, both the BJT Q1 and the BJT Q2 are turned on. The first adjusting resistor 301, the second adjusting resistor 401, and the ground resistor 20 are connected in parallel. A third electric current $I_3$ passing through the indicator light 200 is proportional to the voltage of the power source Vs and inversely proportional to the effective resistance of the ground resistor 20, the first adjusting resistor 301, and the second adjusting resistor 401. In this case, the indicator light 200 lights at a third brightness which is brighter than the second brightness as the third current $I_3$ is greater than the second current $I_2$.

As such, provided that the state operation switch K3 is turned off, the brightness of the indicator light 200 can be adjusted to the first brightness, the second brightness, or the third brightness through adjusting the first adjusting unit 30 and the second unit 40.

However, if the state operation switch K3 is turned on, the PWM outputs a square-wave pulse voltage. When the duty cycle of the square-wave is adjusted to 100%, the control terminal 103 received a high voltage level (a high voltage level of logic 1). The switch unit 10 is turned off. The indicator light 200 is turned off accordingly. When duty ratio of the square-wave is adjusted to below 100%. The indicator light 200 is driven to flash.

The control circuit 100 can only include the first adjusting unit 30 or can include more adjusting units as well as the first adjusting unit 30 and the second adjusting unit 40.

It will be understood that particular exemplary embodiments are shown and described by way of illustration only. The principles and the features of the present disclosure may be employed in various and numerous exemplary embodiments thereof without departing from the scope of the disclosure as claimed. The above-described exemplary embodiments illustrate the scope of the disclosure but do not restrict the scope of the disclosure.

What is claimed is:

1. A control circuit for controlling an indicator light, comprising:
    a power source supplying a voltage;
    a switch unit connected between the power source and the indicator light and configured for turning on or turning off the indicator light;
    a ground resistor connected between the power source and the ground via the indicator light and the switch unit; and
    a first adjusting unit connected in parallel with ground resistor, the first adjusting unit comprising a first adjusting resistor and a first control switch, the adjusting resistor connected between the indicator light and the ground via the first control switch, the first control switch being capable of connecting the first adjusting resistor with the ground resistor in parallel;
    wherein the switch unit comprises a first terminal, a second terminal, and a control terminal, the first terminal electrically connects to the second terminal when the control terminal receives a low voltage level and disconnects from the second terminal when the control terminal receives a high voltage level, the first terminal is connected to the power source, the second terminal is connected to the indicator light, the control terminal is connected to the power source via a first resistor;
    wherein the control circuit further comprises a PWM controller connecting to the control terminal for outputting square-wave pulse voltage to the control terminal.

2. The control circuit as claimed in claim 1, wherein the switch unit is a p-channel MOSFET comprises a source connection, a drain connection and a gate connection which respectively serves as the first terminal, the second terminal and the control terminal.

3. The control circuit as claimed in claim 1, wherein the indicator light comprises a first electrode and a second electrode, the first electrode is connected to the power source via the switch unit, the second electrode is grounded via the ground resistor, the indicator light is an LED, the first electrode is the positive terminal of the LED, the second electrode is the negative terminal of the LED.

4. The control circuit as claimed in claim 3, wherein first adjusting unit further comprise a second resistor, a third resistor, a first operation switch, and a control power source, the first control switch comprises a first connection, a second connection and a third connection, the third connection connects or disconnects the first connection and the second connection, the first connection is connected to the second electrode via the first adjusting resistor, the second connection is grounded, one end of the second resistor is connected to the third connection, the other end of the second resistor is connected to the first operation switch, the first operation switch is connected between the control power source and the second resistor, the third resistor is connected between the third connection and the ground.

5. The control circuit as claimed in claim 4, wherein the first control switch is an npn type BJT, the collector, the emitter and the base of the BJT are respectively serves as the first connection, the second connection and the third connection.

6. The control circuit as claimed in claim 1, wherein the control circuit further comprises a second adjusting unit, the second adjusting unit comprises a second adjusting resistor capable of being connected in parallel with the first adjusting unit.

7. The control circuit as claimed in claim 6, wherein the resistance of the second adjusting resistor is equal to that of the first resistor.

* * * * *